(12) United States Patent
Lin

(10) Patent No.: US 7,007,401 B1
(45) Date of Patent: Mar. 7, 2006

(54) TAPE MEASURE

(76) Inventor: Ping-Lin Lin, P.O. Box No. 6-57, Junghe, Taipei 235 (TW)

( * ) Notice: Subject to any disclaimer, the term of this patent is extended or adjusted under 35 U.S.C. 154(b) by 0 days.

(21) Appl. No.: 11/024,666

(22) Filed: Dec. 30, 2004

(51) Int. Cl.
*G01B 3/10* (2006.01)

(52) U.S. Cl. ..................................... 33/769
(58) Field of Classification Search ............. 33/769, 33/755, 761
See application file for complete search history.

(56) References Cited

U.S. PATENT DOCUMENTS

| | | | | |
|---|---|---|---|---|
| 5,746,004 | A * | 5/1998 | Wertheim | 33/768 |
| 6,272,765 | B1 * | 8/2001 | Li | 33/769 |
| 6,382,547 | B1 * | 5/2002 | Yang | 33/769 |
| 6,910,280 | B1 * | 6/2005 | Scarborough | 33/768 |
| 2003/0233762 | A1 * | 12/2003 | Blackman et al. | 33/769 |

* cited by examiner

Primary Examiner—Christopher W. Fulton

(57) ABSTRACT

A tape measure includes a body made by injection molding, a cover disposed at the body, and a fastener disposed at the cover. A connection portion is formed at a side of the body. The cover is made of flexible plastic by injection molding and is defined with a recess for receiving the connection portion. The fastener fixes the cover to the connection portion of the body through ultrasonic melting.

6 Claims, 4 Drawing Sheets

TAPE MEASURE

BACKGROUND OF THE INVENTION (a) Field of the Invention

The present invention relates to a tape measure, and particularly to a tape measure having a body and a cover covering the body.

(b) Description of the Prior Art

A conventional tape measure has a body which has a multi-layer variation profile. The body is made through the following steps: making a base through first plastic injection molding, and making covering layers on the base through second or third plastic injection molding.

However, the covering layers cannot fully cover the base during the second or third plastic injection molding due to warping or difference of material. Therefore, defective fraction is increased and so cost of the body of the tape measure is increased.

SUMMARY OF THE INVENTION

Accordingly, an object of the present invention is to provide a tape measure having a body and a cover fully covering the body.

Another object of the present invention is to provide a tape measure having body with a multi-layer variation profile.

A further object of the present invention is to provide a tape measure having a body which is easy to make thereby reducing cost thereof.

To achieve the above-mentioned objects, a tape measure in accordance with the present invention includes a body made by injection molding, a cover disposed at the body, and a fastener disposed at the cover. A connection portion is formed at a side of the body. The cover is made of flexible plastic by injection molding and is defined with a recess for receiving the connection portion. The fastener fixes the cover to the connection portion of the body through ultrasonic melting.

Other objects, advantages and novel features of the present invention will be drawn from the following detailed description of a preferred embodiment of the present invention together with the attached drawings, in which:

DETAILED DESCRIPTION OF THE PREFERRED EMBODIMENTS

Figure 1:
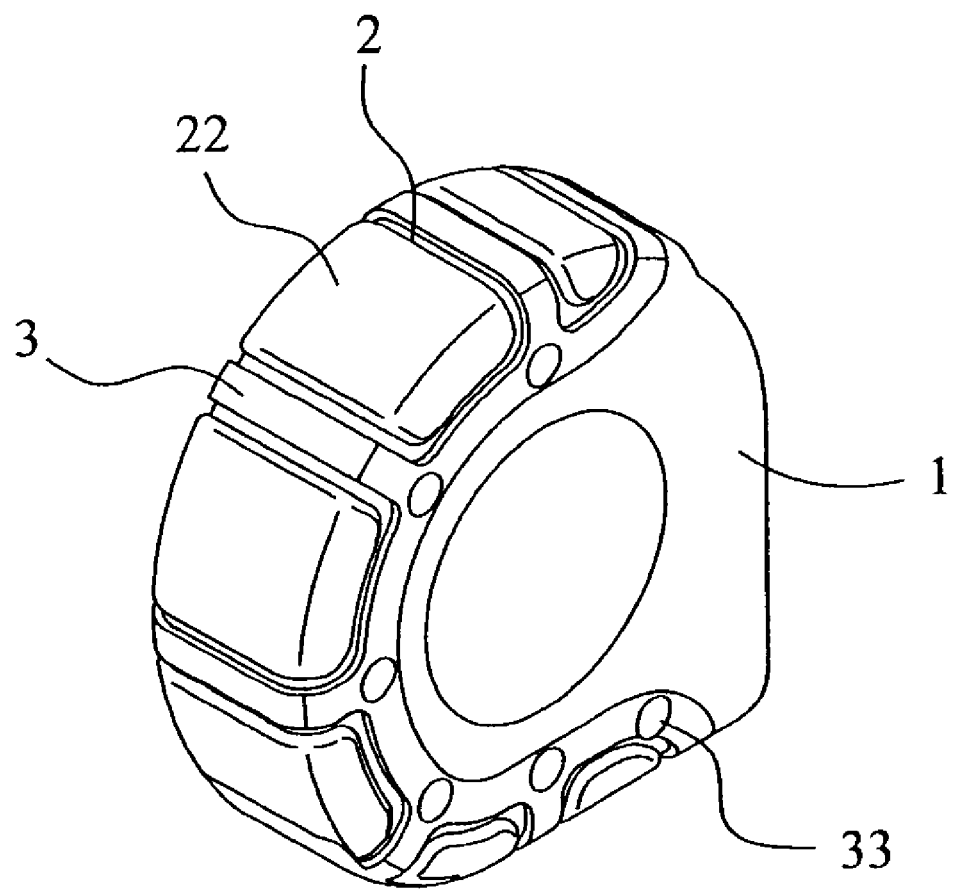
FIG. 1 is a perspective view of a tape measure.
Figure 2:
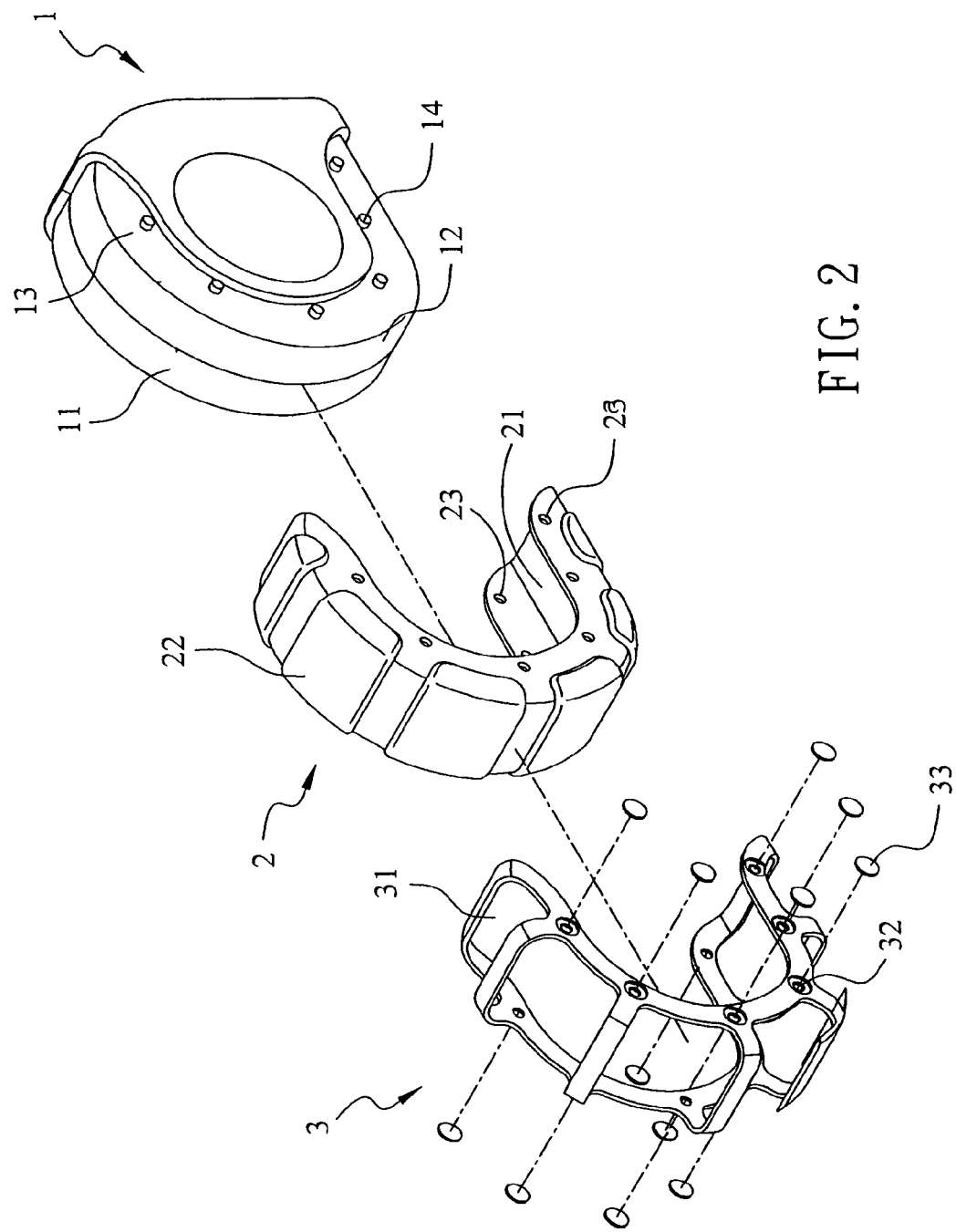
FIG. 2 is an exploded view of FIG. 1.

Referring to FIGS. 1–2, a tape measure of the present invention includes a body 1, a cover 2 and a fastener 3 for making the cover 2 to fully cover the body 1 whereby the body of the tape measure has a multi-layer variation profile and cost of the body is reduced.

The body 1 includes an upper casing 11 and a lower casing 12 connected to the upper casing 11. The body 1 is formed with a connection portion 13 at a side thereof. The body 1 is made by plastic injection molding.

The cover 2 is disposed at the connection portion 13 of the body 1. The cover 2 is made of flexible plastic by injection molding thereby providing a comfortable handle to a user. The cover 2 is defined with a recess 21 for receiving the connection portion 13. A plurality of protrusions 22 extends from an outer surface of the cover 2.

The fastener 3 is disposed at the outer surface of the cover 2 for fixing the cover 2 to the connection portion 13 of the body 1. The fastener 3 is defined with a plurality of through holes 31 for receiving to the protrusions 22. The fastener 3 fixes the body 1 and cover 2 through ultrasonic melting.

The body 1, the cover 2 and the fastener 3 are respectively defined with a plurality of melting holes 14, 23, 32. Each melting hole 32 of the fastener 3 is disposed with a cover plate 33 at an outer portion thereof for decorating the body of the tape measure.

Figure 3:
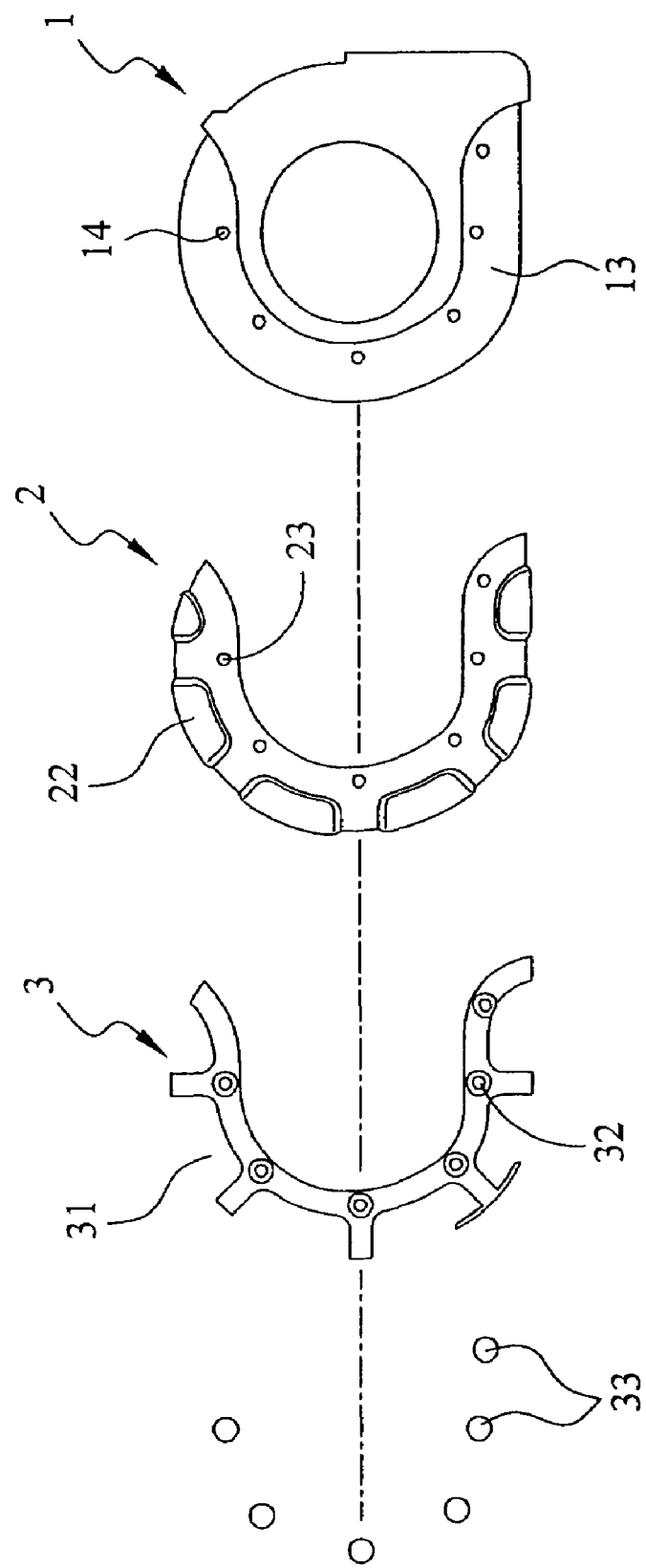
FIG. 3 is a side elevation view of FIG. 2.
Figure 4:
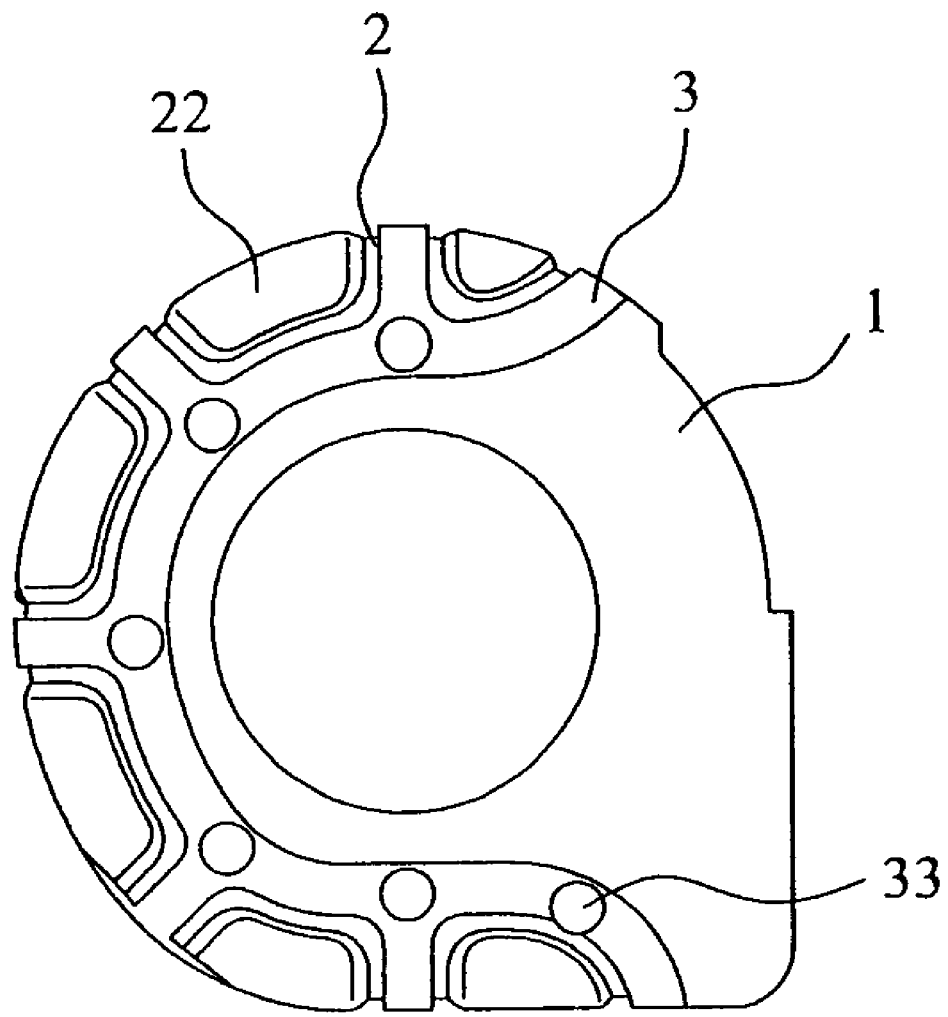
FIG. 4 is an assembled view of FIG. 3.

Referring to FIGS. 3–4, in assembly, the recess 21 of the cover 2 receives the connection portion 13 of the body 1 therein. Then the fastener 3 is disposed at the outer surface of the cover 2 with the through holes 31 thereof correspondingly receiving the protrusions 22 of the cover 2. The melting holes 14, 23, 32 of the body 1, the cover 2 and the fastener 3 are respectively aligned with each other whereby the cover 2 is fixed to the body 1 by the fastener 3 through ultrasonic melting in the melting holes 14, 23, 32. Finally, the melting holes 32 of the fastener 3 are respectively disposed with the cover plates 33. The body 1, the cover 2 and the fastener 3 may be defined with different colors whereby the body of the tape measure is visual. Thus, the cover 2 fully covers the body 1 and the body of the tape measure is ready to have a multi-layer variation profile thereby reducing the cost thereof.

It is understood that the invention may be embodied in other forms without departing from the spirit thereof. Thus, the present examples and embodiments are to be considered in all respects as illustrative and not restrictive, and the invention is not to be limited to the details given therein.

What is claimed is:

1. A tape measure comprising:
   a body made by injection molding, a connection portion being formed at a side of the body;
   a cover disposed at the connection portion of the body, the cover being made of flexible plastic by injection molding and being defined with a recess for receiving the connection portion; and
   a fastener disposed at an outer surface of the cover for fixing the cover to the connection portion of the body through ultrasonic melting.

2. The tape measure as claimed in claim 1, wherein the body includes an upper casing and a lower casing connecting to the upper casing.

3. The tape measure as claimed in claim 1, wherein the body, the cover and the fastener are respectively defined with a plurality of melting holes.

4. The tape measure as claimed in claim 3, wherein an outer portion of each melting hole of the fastener is disposed with a cover plate.

5. The tape measure as claimed in claim 1, wherein the cover is defined with a plurality of protrusions at the outer surface thereof.

6. The tape measure as claimed in claim 5, wherein the fastener is defined with a plurality of through holes for receiving the protrusions.

* * * * *